United States Patent [19]

Hakki et al.

[11] 3,838,359

[45] Sept. 24, 1974

[54] GAIN ASYMMETRY IN HETEROSTRUCTURE JUNCTION LASERS OPERATING IN A FUNDAMENTAL TRANSVERSE MODE

[75] Inventors: Basil Wahid Hakki, Summit, N.J.; Cherng-Jia Hwang, Palo Alto, Calif.

[73] Assignee: Bell Telephone Laboratories, Murray Hill, N.J.

[22] Filed: Nov. 23, 1973

[21] Appl. No.: 418,572

[52] U.S. Cl................ 331/94.5 H, 357/16, 357/18, 357/37
[51] Int. Cl. ............................................ H01f 3/00
[58] Field of Search............ 331/94.5 H; 317/235 N, 317/235 AC

[56] References Cited
UNITED STATES PATENTS

| | | | |
|---|---|---|---|
| 3,691,476 | 9/1972 | Hayashi | 331/94.5 H |
| 3,733,561 | 5/1973 | Hayashi | 331/94.5 H |
| 3,758,875 | 9/1973 | Hayashi | 331/94.5 H |

FOREIGN PATENTS OR APPLICATIONS

| | | |
|---|---|---|
| 1,263,835 | 2/1972 | Great Britain |

OTHER PUBLICATIONS

Butler, "Theory Of Transverse Cavity Mode Selection in Homojunction and Heterojunction Semiconductors Diode Lasers," Journal of Applied Physics, Vol. 42, page 4447.

Butler et al., "Transverse Mode Selection in Injection Lasers with Widely Spaced Heterojunctions," Journal of Applied Physics, Vol. 43, p. 3403.

*Primary Examiner*—Edward S. Bauer
*Attorney, Agent, or Firm*—M. J. Urbano

[57] ABSTRACT

Fundamental transverse mode, high power pulsed operation is achieved in a double heterostructure junction laser which includes a third junction located within the waveguide so as to define a lossy region and a gain region, the latter being preferably twice as thick as the former. The invention is characterized in that (1) the third junction is a heterojunction which provides a barrier of at least 2kT approximately in order to reduce minority carrier injection into the lossy region, but not so high as to introduce a change in refractive index large enough to excite a higher order mode in the gain region (2) the majority carrier concentration in the lossy region is equal to or greater than the electron concentration in the gain region under lasing conditions, (3) at least one of the three heterojunctions is a p-n heterojunction, and (4) the thickness of $d_g$ of the gain region satisfies the condition $\delta n \, d_g^2 < 9\lambda^2/32n$ in order that a first order mode is not excited in the gain region, where $\delta n$ is the refractive index step at the third heterojunction, $\lambda$ is the free space wavelength of the laser, and $n$ is the refractive index of the gain region.

20 Claims, 4 Drawing Figures

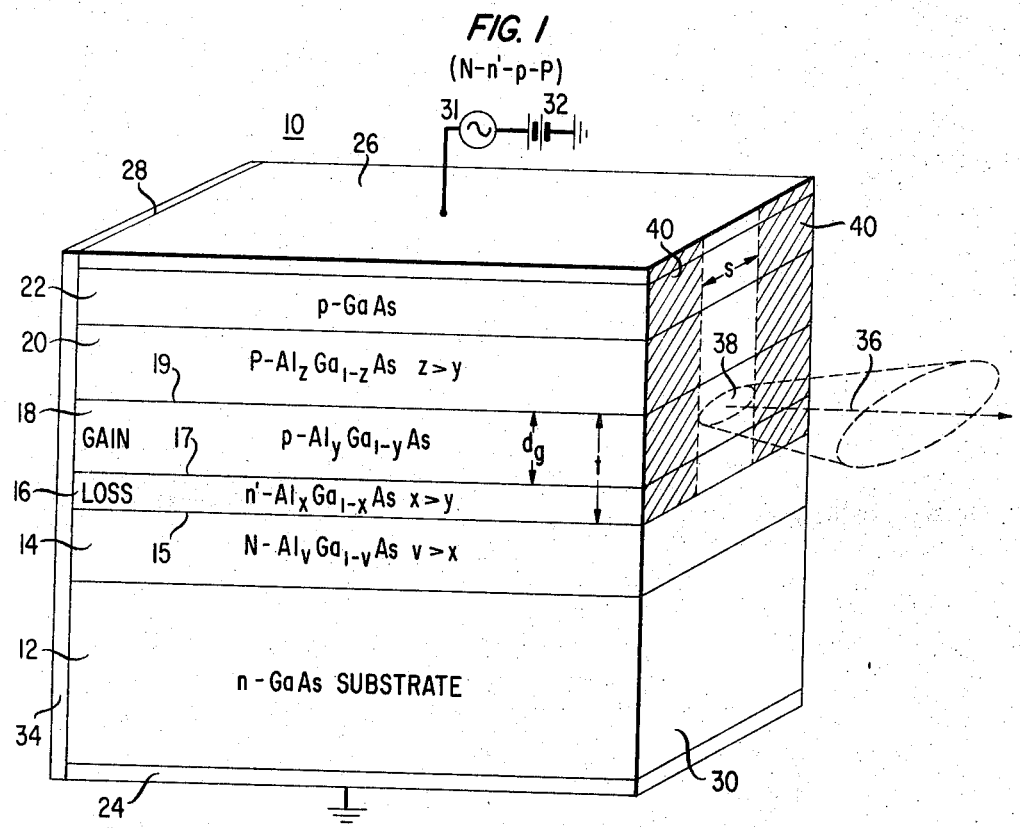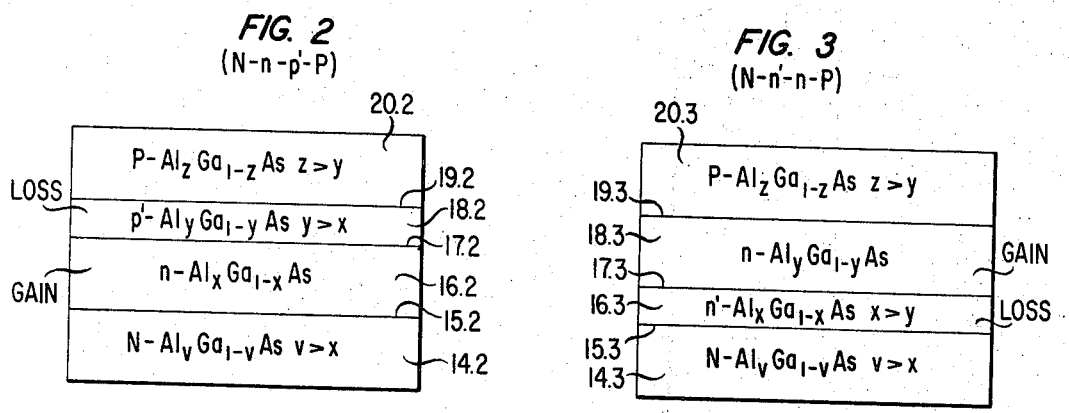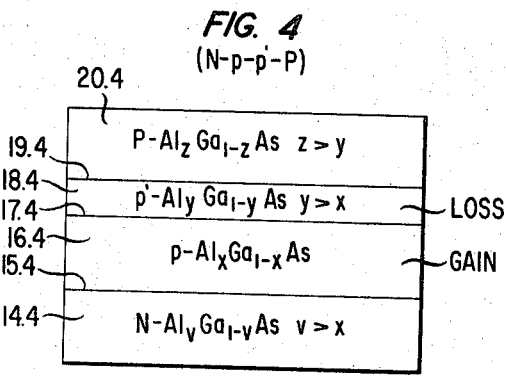

GAIN ASYMMETRY IN HETEROSTRUCTURE JUNCTION LASERS OPERATING IN A FUNDAMENTAL TRANSVERSE MODE

BACKGROUND OF THE INVENTION

This invention relates to semiconductor junction lasers and, more particularly, to heterostructure junction lasers adapted for fundamental transverse mode, high power pulsed operation.

Lasers are operated in pulsed mode usually when high power outputs are desired for applications such as, for example, the micrographics system described by D. Mayden et al. in U.S. Pat. No. 3,720,784 (Case 3-2-12) issued on Mar. 13, 1973. To this end the laser is preferably operated in a fundamental transverse mode which, by definition, is characterized by a single intensity maximum centered on the resonator axis and a smaller farfield angular divergence with respect to this axis compared to higher order modes.

One suggestion for achieving such laser outputs was made by L. A. D'Asaro et al in U.S. Pat. application Ser. No. 203,709 filed on Dec. 1, 1971 and now abandoned. They proposed a GaAs-AlGaAs double heterostructure (DH) junction laser including a p-n homojunction positioned within the waveguide so as to define a gain region and a lossy region. The waveguide was formed by a pair of common-conductivity-type heterojunctions which, in conjunction with the p-n homojunction, formed a P-p-n-N structure. Hereinafter the use of upper case letters (P, N) indicates layers of wider bandgap than layers designated by lower case letters (p, n). In order to discriminate against higher order transverse modes perpendicular to the junction plane, the homojunction was located so that the lossy region was less than one-half of the waveguide thickness with an optimum in the range 0.2 to 0.4.

Our experiments have demonstrated, however, that the D'Asaro et al. DH laser operated solely in the fundamental transverse mode only for current levels very near the lasing threshold. That is, at currents more than about 5 percent above threshold higher order modes were observed to oscillate. In order to obtain sufficient pulsed power outputs for most applications, such as the micrographics system, a DH laser would be operated at a current approximately two or more times the threshold value. It was apparent, therefore, that the D'Asaro et al. DH laser was inadequate for achieving simultaneously high power pulsed outputs and oscillation in a fundamental transverse mode.

Our experimental observations of the D'Asaro et al DH laser led us to reconsider that structure in detail. We concluded that the basic problem resided in a failure to understand that the gain and lossy regions need to be defined not only at low current densities but also at and above the lasing threshold. That is, we have recognized that the p-n homojunction of the D'Asaro et al DH laser is incapable of providing spatial definition of the gain and lossy regions because at and above the lasing threshold carriers are injected across the homojunction into the lossy region, thereby reducing its loss and eventually converting it into gain.

In order to understand this phenomenon better, consider the specific case of a D'Asaro et al DH laser in which the lossy region is n-GaAs and the gain region is p-GaAs. These regions are bounded, respectively, by layers of n-AlGaAs and p-AlGaAs. Since the lossy region is usually lightly doped n-GaAs, its Fermi level lies below the conduction band-edge. At low currents (or current densities) the junction current is predominantly electron flow into the p-GaAs region. But, at currents close to the lasing threshold, the carrier concentration in the gain region is typically about $2 \times 10^{18}$ cm$^{-3}$. Because space charge neutrality requires equal numbers of positive and negative charges in the gain region, the electron quasi-Fermi level in the gain region moves up into the conduction band. Under these conditions holes readily flow from the p-GaAs gain region into the n-GaAs lossy region to such an extent that both the quantum efficiency of the device and the loss in the lossy region are reduced. This hole injection may even convert the loss to gain in the lossy region because the latter is nominally one-half the thickness of the gain region and, therefore, requires roughly half the current density to invert its population. The latter effect virtually eliminates the intended fundamental mode selective properties of the structure; i.e., higher order modes are not discriminated against.

SUMMARY OF THE INVENTION

We have found that in order to spatially define the gain and lossy regions at currents above the lasing threshold, several measures are taken: (1) the majority carrier concentration in the lossy region is made to be equal to or greater than the electron concentration in the gain region under lasing conditions, and (2) the lossy region is made of a wider bandgap material than the gain region. The first measure moves the majority carrier Fermi level in the lossy region to a position above the conductive band-edge (n-type lossy region) or below the valence band-edge (p-type lossy region) by an amount equal to or greater than that associated with lasing. This measure partially prevents the "back-flow" (i.e., injection) of minority carriers from the gain region into the lossy region. The second measure also prevents such back-flow by forming a p-n heterojunction at the interface between the gain and lossy regions. This structure will be designated P-p-n'-N, where the prime notation hereinafter indicates that the n' layer has a wider bandgap than the p-layer. An essentially equivalent laser based primarily upon hole injection instead of electron injection into the gain region comprises a P-p'-n-N structure. In general, the barrier associated with the heterojunction should be at least 2kT approximately in order to reduce carrier back-flow from the gain region into the lossy region. On the other hand, the discontinuity in refractive index associated with the barrier should not be so high as to excite a higher order mode in the gain region.

To better understand the latter requirement, consider that the gain region of thickness $d_g$ is bounded on one side by the p-n heterojunction and on the other side by a common-conductivity-type. heterojunction. Associated with these heterojunctions are, respectively, refractive index discontinuities $\delta n$ and $\Delta n$ -Al$_y$. that in most practical cases $\delta n < < \Delta n$. Consequently, since the gain region has a smaller bandgap (and hence higher refractive index) than the regions bounding it, the gain region forms an asymmetric waveguide within the waveguide formed by the common-conductivity-type heterojunctions. The asymmetric waveguide can support a first order transverse mode if its width $d_g$ exceeds a certain value. In order to insure that a first order transverse mode, and hence higher order modes, are not excited in the gain region, the following condition, derived by solving the boundary value problem associated with the asymmetric waveguide, should be satisfied:

$$\delta n d_g^2 < 9\lambda^2/32 n_g$$

where $\lambda$ is the free space wavelength of the laser radiation and $n_g$ is the refractive index of the gain region.

Also described hereinafter are alternative embodiments in which the third heterojunction is a common-conductivity-type heterojunction, i.e., N-n'-n-P and N-p-p'-P structures.

BRIEF DESCRIPTION OF THE DRAWING

Our invention, together with its various features and advantages, can be easily understood from the following more detailed description taken in conjunction with the accompanying drawing, in which:

FIG. 1 shows an N-n'-p-P DH laser in accordance with an illustrative embodiment of our invention;

FIG. 2 shows an N-n-p'-P structure in accordance with another embodiment of our invention;

FIG. 3 shows an N-n'-n-P structure in accordance with yet another embodiment of our invention; and FIG. 4 shows an N-p-p'-P structure in accordance with still another embodiment of our invention.

DETAILED DESCRIPTION

Turning now to FIG. 1, there is shown schematically a DH laser 10 in accordance with an illustrative embodiment of our invention. The laser 10 comprises a substrate 12 of one conductivity type upon which are formed the following layers in the order recited: a wide bandgap layer 14, a pair of narrower bandgap layers 16 and 18, a wider bandgap layer 20, and a contacting layer 22 having the same conductivity type as layer 20. Layer 22 is optional, depending on the difficulty of forming an electrical contact directly on layer 20. Electrical contacts 24 and 26 are formed, respectively, on the exposed major surfaces of substrate 12 and layer 22. One or more heat sinks (not shown) may be thermally coupled to either contact (or to both) in order to extract heat from the device in a manner well known in the art.

In general, the double heterostructure is defined by layers 14, 16, 18 and 20. That is, of the four layers, layers 14 and 20 have the widest bandgaps (not necessarily equal to one another). Layers 16 and 18 have narrower bandgaps which are generally not equal to one another. These layers form three heterojunctions 15, 17 and 19 at the interfaces, respectively, between layers 14 and 16, layers 16 and 18, and layers 18 and 20. At least one of the heterojunctions is a p-n heterojunction whereas the other two are common-conductivity-type heterojunctions. Heterojunctions 15 and 19 define an optical waveguide. In general, the conductivity types of layers 14, 16, 18 and 20 may be either N-n'-p-P (FIG. 1), N-n-p'-P (FIG. 2), N-n'-n-P (FIG. 3) or N-p-p'-P (FIG. 4). The active region of the laser, in which radiative recombination of electrons and holes produces radiation in the form of beam 36, is the one of the narrower bandgap layers (16 or 18) which is adjacent the p-n heterojunction (i.e., layer 18 in FIG. 1, layer 16.2 in FIG. 2, layer 18.3 in FIG. 3, and layer 16.4 in FIG. 4).

In addition, the structure is cleaved or polished optically flat along parallel surfaces 28 and 30 which form an optical resonator for sustaining pulsed laser oscillations when the structure is forward biased, illustratively by means of battery 32, and current pulses are applied thereto above the lasing threshold by means of pulses source 31. Optionally, an antireflection coating is formed on surface 28 in order to produce an output beam (not shown) which emanates from layer 18 and through surface 28. Of course, another lower power output beam 36 emanates through surface 30. In addition, a stripe contact geometry may be defined so that the radiation guided between heterojunctions 15 and 19 is laterally confined to a zone 38, thereby to restrict oscillation to the fundamental transverse mode parallel to the junction plane.

The manner in which the DH laser oscillation is restricted to the fundamental transverse mode perpendicular to the junction plane can be understood as follows, specific reference being made to the embodiment of FIG. 1 for convenience only. The term "mode" as used hereinafter means a transverse mode perpendicular to the junction plane. The thickness $d_g$ of the gain region defined by layer 18 is made to be more than one-half the distance $t$ between heterojunctions 15 and 19 which define an optical waveguide. Preferably $d_g$ is about two-thirds as large as $t$, i.e., the thickness of the gain region is about twice as large as the thickness of the lossy region defined by layer 16. In the prior art configuration of D'Asaro et al, supra, which used a homojunction at interface 17, this relationship of gain-to-loss region thickness was assumed to be adequate in suppressing higher transverse modes; i.e., they taught that higher order modes would have one or more intensity maxima in the lossy region and would thereby be suppressed, whereas the fundamental mode would have its single maximum in the gain region and would therefore be favored. As discussed in detail previously, however, we have found that the prior art device fails to provide adequate discrimination against higher order transverse modes at current levels above threshold and of practical interest. In contrast, we have found that the following characterizing features produce adequate higher order mode discrimination, and hence fundamental mode operation, at practical current levels. First, the majority carrier concentration in the lossy region (layer 16) is made to be equal to or greater than the electron concentration in the gain region (layer 18) under lasing conditions. Second, the lossy region is made of wider bandgap material than the gain region, thereby forming a p-n heterojunction 17 at the interface between the gain and lossy regions. The barrier associated with heterojunction 17 should be large enough (at least 2kT approximately) to prevent minority carriers from being injected from the gain region into the lossy region. On the other hand, the discontinuity in refractive index associated with the barrier should not be so large as to excite a higher order mode in the gain region. Third, in order to insure that a first order mode, and hence higher order modes, are not excited in the gain region, inequality (1), repeated here, should be satisfied:

$$\delta n d_g^2 < 9\lambda^2/32n_g, \quad (1)$$

where $\lambda$ is the free space wavelength of the laser radiation and $n_g$ is the refractive index of the gain region.

In a preferred embodiment of our invention, the various layers of the DH laser are fabricated from a mixed crystal semiconductor system (e.g., GaAs-AlGaAs) which is substantially lattice matched for all compositions thereof to be utilized. Illustratively, layers 12 (substrate), 14, 16, 18, 20 and 22 comprise, respectively, n-GaAs, N-Al$_v$Ga$_{1-v}$As, n'-Al$_x$Ga$_{1-x}$As ($x < v$), p-Al$_y$Ga$_{1-y}$As ($y < x$), P-Al$_z$Ga$_{1-z}$As ($z > y$) and p-GaAs. Of course, it is well recognized in the art that the conductivity type of each layer may be reversed to produce a complementary device when utilizing a p-type substrate. In one example of a DH laser 10 grown by liquid phase epitaxy, the structure comprised the parameters set forth in the following table.

| LAYER | THICKNESS | COMPOSITION |
|---|---|---|
| 12 (sub) | | n-GaAs:Si 3×10$^{18}$ cm$^{-3}$, <100> |
| 14 | 2.0μm | N-Al$_{0.3}$Ga$_{0.7}$As:Te 3×10$^{17}$ cm$^{-3}$ |
| 16 (loss) | 0.8μm | n'-Al$_{0.04}$Ga$_{0.96}$As:Te 3×10$^{18}$ cm$^{-3}$ |
| 18 (gain) | 1.6μm ($d_g$) | p-GaAs:Ge 4×10$^{17}$ cm$^{-3}$ |
| 20 | 1.5μm | P-Al$_{0.3}$Ga$_{0.7}$As:Ge 4×10$^{17}$ cm$^{-3}$ |
| 22 | 2.0μm | p-GaAs:Ge 2×10$^{18}$ cm$^{-3}$ |

The overall dimensions of the laser were approximately 250μm (width), 380μm (length) and 100μm (thickness).

That the above DH laser satisfies the criterion previously set forth can be seen as follows. First, the donor concentration in the lossy region (layer 16) is 3 × 10$^{18}$ cm$^{-3}$ which exceeds the electron concentration of about 2 × 10$^{18}$ cm$^{-3}$ in the gain region under lasing conditions. Second, the bandgap in the lossy region exceeds that in the gain region because the mole fraction of aluminum in the former ($x = 0.04$) is greater than that in the latter ($y = 0$). Third, since the gain region is GaAs, $\lambda = 0.89\mu m$ and $n_g = 3.59$ so that inequality (1) reduces to $$\delta n d_g^2 < 6.2 \times 10^{-2} \mu m^2. \quad (2)$$

Utilizing results published by J. K. Butler and H. Kressel in Journal of Applied Physics, Vol. 43, page 3403 (1972) that $\delta n \approx 0.41x$, we get $$x d_g^2 < 15 \times 10^{-2} \mu m^2. \quad (3)$$

In our DH lasers $x = 0.04$ and $d_g = 1.6\mu m$ so that $xd_g^2 = 10.2 \times 10^{-2} \mu m^2$ which satisfies inequality (3). Note also that the thickness of the gain region (1.6μm) is twice that of the lossy region (0.8μm) so that nearly optimum discrimination should result. Finally, $x = 0.04$ in the lossy region produces an increase in bandgap therein of about 50 meV (each per cent mole fraction of aluminum increases the bandgap by 12 meV as long as $x$ is less than 0.35–0.40, the point at which AlGaAs becomes an indirect gap semiconductor). This increased bandgap provides a barrier of about 2kT for holes which is adequate to maintain loss in the lossy region, i.e., prevent hole injection into the lossy region for currents of practical interest.

This particular DH laser had a stripe contact width S of about 12 μm defined by proton bombardment of zones 40 along the length of the laser (about 380 μm) as taught by L, A. D'Asaro et al in copending application Ser. No. 204,222 (Case 10-4-6-3) filed on December 2, 1971. For devices with these parameters, the lasing threshold was typically about 0.7 Ampere. Lasing started in the fundamental transverse mode perpendicular to the junction plane and continued to operate in that mode up to current which, depending on the particular device, varied between 1.5 and 2.0 Amperes (i.e., about 2 to 3 times threshold).

The maximum current for which the DH laser operated in the fundamental transverse mode depends in part on the material homogeneity. If the waveguide and the medium are perfectly homogeneous, the laser should operate in the fundamental mode until catastrophic damage occurs at the mirrors, i.e., at an optical power density of about 5 × 10$^6$ W cm$^{-2}$. In practice, the maximum current for fundamental mode dominance is limited by material imperfections. These imperfections either couple power from one mode into another, or change the local gain distribution within the waveguide, thereby leading to the excitation of higher order modes. Typically, our DH lasers have delivered up to 200 to 300 mW of peak power (pulsed) from one end in the fundamental mode when driven by 100 nsec pulses from source 31.

Additional suppression of higher order modes and higher power outputs, are achieved, however, by employing a multilayer antireflection (AR) coating as taught by B. W. Hakki in copending application Ser. No. 348,161 (Case 10) filed on Apr. 5, 1973. More specifically, by utilizing a ZnS-Al$_2$O$_3$ AR coating 34 on the above-described GaAs-AlGaAs DH laser, we have been able to improve the purity of the fundamental mode (>93 percent) and have attained 750 mW of peak power (pulsed) in the output beam (not shown) which passes through coating 34. The thickness of the ZnS film, which was innermost, was about 432 A and that of the Al$_2$O$_3$ film, which was outermost, was about 1105 A. Such outputs are adequate for micrographics systems applications, for example. Moreover, we have obtained up to 36 mW of average power for duty cycles approaching ten percent.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, whenever the chemical formula AlGaAs is utilized herein, it is intended that other Group III(a) and/or Group V(a) elements can be substituted to form mixed crystals such as, for example, AlGaAsP. The latter material is particularly useful for reducing stress and dislocations in multilayer structures as taught in copending applications, Ser. No. 414,664 (Panish-Rozgonyi 10-4) entitled "Stress Reduction in AlGaAs-AlGaAsP Multilayered Structures" and Ser. No. 414,674 (Petroff-Rozgonyi 1-5) entitled "Reduction of Dislocations in AlGaAs-AlGaAsP Multilayer Structures" concurrently filed with one another on Nov. 12, 1973.

Moreover, the conductivity types and bandgaps of layers 14, 16, 18 and 20, which define a double heterostructure, may vary depending on the particular structure of our invention used to achieve fundamental transverse mode, high power pulsed operation. That is, FIG. 2 shows an N-n-p'-P structure in which the n-$Al_xGa_{1-x}As$ layer 16.2 is the gain region, the p'-$Al_yGa_{1-y}As$ layer 18.2 ($y>x$) is the lossy region and the p-n heterojunction is formed at interface 17.2. FIG. 3, on the other hand, shows an N-n'-n-P structure in which the n'-$Al_xGa_{1-x}As$ layer 16.3 is the lossy region, the n-$Al_yGa_{1-y}As$ layer 18.4 ($y<x$) is the gain region and the p-n heterojunction is formed at the interface 19.3. Similarly, FIG. 4 shows an N-p-p'-P structure in which the p-$Al_xGa_{1-x}As$ layer 16.4 is the gain region, the p'-$Al_yGa_{1-y}As$ layer 18.4 is the lossy region and the p-n heterojunction is formed at the interface 15.4. Note that the devices of FIGS. 1 and 4 operate primarily on the basis of electron injection into the gain region whereas the devices of FIGS. 2 and 3 operate primarily on the basis of hole injection.

What is claimed is:

1. In a semiconductor junction laser, a semiconductor body comprising a pair of heterojunctions defining an optical waveguide, means disposed between said pair of heterojunctions for dividing said waveguide into two contiguous regions, one of said regions exhibiting loss (the lossy region) and the other exhibiting gain (the gain region) under lasing conditions, said gain region being thicker than said lossy region,

CHARACTERIZED IN THAT:

said dividing means comprises a third heterojunction, at least one of said heterojunctions is a p-n heterojunction, the majority carrier construction in said lossy region is equal to or greater than the electron concentration in said gain region under lasing conditions, and the thickness $d_g$ of said gain region satisfies the inequality $\delta n d_g^2 < 9\lambda^2/32 n_g$ where $\delta n$ is the refractive index discontinuity at said third heterojunction, $\lambda$ is the free space wavelength of the laser radiation and $n_g$ is the refractive index of said gain region.

2. The body of claim 1 wherein the thickness of said gain region is approximately twice that of said lossy region.

3. The body of claim 1 wherein said gain region comprises $Al_yGa_{1-y}As$ and said lossy region comprises $Al_xGa_{1-x}As$, $x > y \geq 0$.

4. The body of claim 3 wherein $y = 0$ and said gain region comprises GaAs.

5. The body of claim 4 wherein $\delta n d_g^2 < 6.2 \times 10^{-2}$ $\mu m^2$.

6. The body of claim 4 wherein said gain region is p-type and said lossy region is n-type.

7. The body of claim 6 wherein the donor concentration in said n-type lossy region is greater than or equal to approximately $2 \times 10^{18}$ cm$^{-3}$.

8. The body of claim 3 including a first layer of $Al_vGa_{1-v}As$, $v > x$, contiguous with said lossy region, a second layer of $Al_zGa_{1-z}As$, $z > y$, contiguous with said gain region, thereby forming one of said pair of heterojunctions at the interface between said first layer and said lossy region and forming the other one of said pair of heterojunctions at the interface between said second layer and said gain region.

9. The body of claim 8 wherein said first layer and said lossy region have one conductivity type and said second layer and said gain region have the opposite conductivity type.

10. The body of claim 8 wherein said gain and loss regions have the same conductivity type and said first and second layers have conductivity types opposite to one another.

11. The body of claim 8 including a pair of surfaces parallel to one another and perpendicular to the plane of said heterojunctions thereby forming an optical resonator and an antireflection coating formed on one of said surfaces, said coating comprising contiguous layers of ZnS and $Al_2O_3$.

12. The body of claim 8 including means defining a stripe geometry electrical contact on a major surface of said body.

13. The body of claim 1 including means for forward biasing said p-n junction and for applying current thereto in the form of pulses.

14. In a semiconductor junction laser a semiconductor body comprising an n-GaAs substrate and a plurality of epitaxial layers grown thereon in the following order:

a layer of N-$Al_vGa_{1-v}As$, a layer of n'-$Al_xGa_{1-x}As$, $v > x$, a layer of p-$Al_yGa_{1-y}As$, a layer of P-$Al_zGa_{1-z}As$, $z > y$, a layer of p-GaAs, a metal contact formed on said p-GaAs layer, and a metal contact formed on said n-GaAs substrate, a pair of spaced parallel cleavage surfaces perpendicular to the plane of said layers and forming an optical resonator, an antireflection coating formed on one of said surfaces and comprising contiguous layers of ZnS and $Al_2O_3$, means defining a stripe geometry electrical contact to said p-GaAs layer comprising a pair of spaced proton-bombarded high resistivity zones extending between said cleavage surfaces and from the top of said p-GaAs layer through at least said p-$Al_yGa_{1-y}As$ layer,

CHARACTERIZED IN THAT said p-$Al_yGa_{1-y}$ As layer defines a gain region and said n'-$Al_xGa_{1-x}As$ layer defines a lossy region, the gain region being thicker than the lossy region, $x$ is greater than $y$ so that the bandgap in lossy region is greater than that in said gain region, the donor concentration in said lossy region is greater than or equal to the electron concentration in said gain region under lasing conditions, and the thickness $d_g$ of said gain region satisfies the inequality $\delta n d_g^2 < 9\lambda^2/32 n_g$, where $\delta n$ is the refractive index at the interface between said gain and lossy regions, $\lambda$ is the free space wavelength of the laser radiation, and $n_g$ is the refractive index of said gain region.

15. The body of claim 14 wherein the donor concentration in said lossy region is greater than or equal to approximately $2 \times 10^{18}$ cm$^{-3}$.

16. The body of claim 14 wherein the thickness of said gain region is approximately twice that of said lossy region.

17. The body of claim 14 including means for forward biasing said body and for applying current thereto in the form of pulses.

18. In a semiconductor junction laser a semiconductor body comprising an n-GaAs substrate and a plurality of epitaxial layers grown thereon in the following order:
a layer of N-$Al_vGa_{1-v}As$,
a layer of n-$Al_xGa_{1-x}As$, $v > x$,
a layer of p'-$Al_yGa_{1-y}As$,
a layer of P-$Al_zGa_{1-z}As$, $z > y$,
a layer of p-GaAs,
a metal contact formed on said p-GaAs layer, and a metal contact formed on said n-GaAs substrate,
a pair of spaced parallel cleavage surfaces perpendicular to the plane of said layers and forming an optical resonator,
an antireflection coating formed on one of said surfaces and comprising contiguous layers of ZnS and $Al_2O_3$,
means defining a stripe geometry electrical contact to said p-GaAs layer comprising a pair of spaced proton-bombarded high resistivity zones extending between said cleavage surfaces and from the top of said p-GaAs layer through at least said p'-$Al_yGa_{1-y}As$ layer,

CHARACTERIZED IN THAT said n-$Al_xGa_{1-x}As$ layer defines a gain region and said p'-$Al_yGa_{1-y}As$ layer defines a lossy region, the gain region being thicker than the lossy region, $y$ is greater than $x$ so that the bandgap in lossy region is greater than that in said gain region, the acceptor concentration in said lossy region is greater than or equal to the electron concentration in said gain region under lasing conditions, and the thickness $d_g$ of said gain region satisfies the inequality $\delta n d_g^2 < 9\lambda^2/32n_g$, where $\delta n$ is the refractive index at the interface between said gain and lossy regions, $\lambda$ is the free space wavelength of the laser radiation, and $n_g$ is the refractive index of said gain region.

19. In a semiconductor junction laser a semiconductor body comprising an n-GaAs substrate and a plurality of epitaxial layers grown thereon in the following order:
a layer of n'-$Al_vGa_{1-v}As$,
a layer of n'-$Al_xGa_{1-x}As$, $v > x$,
a layer of n-$Al_yGa_{1-y}As$,
a layer of P-$Al_zGa_{1-z}As$, $z > y$,
a layer of p-GaAs,
a metal contact formed on said p-GaAs layer, and a metal contact formed on said n-GaAs substrate,
a pair of spaced parallel cleavage surfaces perpendicular to the plane of said layers and forming an optical resonator,
an antireflection coating formed on one of said surfaces and comprising contiguous layers of ZnS and $Al_2O_3$,
means defining a stripe geometry electrical contact to said p-GaAs layer comprising a pair of spaced proton-bombarded high resistivity zones extending between said cleavage surfaces and from the top of said p-GaAs layer through at least said P-$Al_zGa_{1-z}As$ layer,

CHARACTERIZED IN THAT said n-$Al_yGa_{1-y}As$ layer defines a gain region and said n'-$Al_xGa_{1-x}As$ layer defines a lossy region, the gain region being thicker than the lossy region, $x$ is greater than $y$ so that the bandgap in lossy region is greater than that in said gain region, the donor concentration in said lossy region is greater than or equal to the electron concentration in said gain region under lasing conditions, and the thickness $d_g$ of said gain region satisfies the inequality $\delta n d_g^2 < 9\lambda^2/32n_g$, where $\delta n$ is the refractive index at the interface between said gain and lossy regions, $\lambda$ is the free space wavelength of the laser radiation, and $n_g$ is the refractive index of said gain region.

20. In a semiconductor junction laser a semiconductor body comprising an n-GaAs substrate and a plurality of epitaxial layers grown thereon in the following order:
a layer of N-$Al_vGa_{1-v}As$,
a layer of p-$Al_xGa_{1-x}As$, $v > x$,
a layer of p'-$Al_yGa_{1-y}As$,
a layer of P-$Al_zGa_{1-z}As$, $z > y$,
a layer of p-GaAs,
a metal contact formed on said p-GaAs layer, and a metal contact formed on said n-GaAs substrate,
a pair of spaced parallel cleavage surfaces perpendicular to the plane of said layers and forming an optical resonator,
an antireflection coating formed on one of said surfaces and comprising contiguous layers of ZnS and $Al_2O_3$,
means defining a stripe geometry electrical contact to said p-GaAS layer comprising a pair of spaced proton-bombarded high resistivity zones extending between said cleavage surfaces and from the top of said p-GaAs layer through at least said p-$Al_xGa_{1-x}As$ layer, CHARACTERIZED IN THAT said p-$Al_xGa_{1-x}As$ layer defines a gain region and said p'-$Al_{Ga1-y}As$ layer defines a lossy region, the gain region being thicker than the lossy region, $y$ is greater than $x$ so that the bandgap in lossy region is greater than that in said gain region, the acceptor concentration in said lossy region is greater than or equal to the electron concentration in said gain region under lasing conditions, and the thickness $d_g$ of said gain region satisfies the inequality $\delta n d_g^2 < 9\lambda^2/32n_g$, where $\delta n$ is the refractive index at the interface between said gain and lossy regions, $\lambda$ is the free space wavelength of the laser radiation, and $n_g$ is the refractive index of said gain region.

* * * * *

UNITED STATES PATENT OFFICE
CERTIFICATE OF CORRECTION

Patent No. 3,838,359     Dated September 24, 1974

Inventor(s) Basil W. Hakki and Cherng-Jia Hwang

It is certified that error appears in the above-identified patent and that said Letters Patent are hereby corrected as shown below:

Column 1, line 14, change "Mayden" to --Maydan--.

Column 2, line 56, remove period after "common-conductivity-type".

Column 2, line 59, delete "-$Al_y$-" and insert --such--.

Column 7, line 36, delete "construction" and insert --concentration--.

Column 9, line 46, change "$n'-Al_v Ga_{1-v} As$," to --$N-Al_v Ga_{1-v} As$,--.

Column 10, line 46, change "$p'-Al_{Ga\ 1-y} As$" to --$p'-Al_y Ga_{1-y} As$--.

Abstract, Line 17, after "thickness" delete "of" second occurrence.

Signed and sealed this 7th day of January 1975.

(SEAL)
Attest:

McCOY M. GIBSON JR.
Attesting Officer

C. MARSHALL DANN
Commissioner of Patents